(12) United States Patent
Picard et al.

(10) Patent No.: US 10,955,615 B2
(45) Date of Patent: Mar. 23, 2021

(54) MANAGING MODE TRANSFER IN ASYMMETRIC WAVEGUIDE COUPLING STRUCTURES

(71) Applicant: Ciena Corporation, Hanover, MD (US)

(72) Inventors: Marie-Josee Picard, L'Ancienne-Lorette (CA); Alexandre Delisle-Simard, Quebec (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/511,639

(22) Filed: Jul. 15, 2019

(65) Prior Publication Data
US 2021/0018681 A1    Jan. 21, 2021

(51) Int. Cl.
| | | |
|---|---|---|
| *G02B 6/122* | (2006.01) | |
| *G02B 6/14* | (2006.01) | |
| *G02B 6/126* | (2006.01) | |
| *G02B 6/12* | (2006.01) | |

(52) U.S. Cl.
CPC .......... *G02B 6/1228* (2013.01); *G02B 6/126* (2013.01); *G02B 6/14* (2013.01); *G02B 2006/12195* (2013.01)

(58) Field of Classification Search
CPC ........ G02B 6/126; G02B 6/14; G02B 6/1228; G02B 6/2766; G02B 2006/12195; H04J 14/00; H04J 14/06; H04J 14/04
See application file for complete search history.

(56) References Cited

U.S. PATENT DOCUMENTS

| | | | | |
|---|---|---|---|---|
| 7,228,015 | B2 * | 6/2007 | Watts | G02B 6/126 |
| | | | | 385/11 |
| 7,792,403 | B1 | 9/2010 | Little et al. | |
| 8,948,549 | B2 | 2/2015 | Picard et al. | |
| 9,529,151 | B2 * | 12/2016 | Goi | G02B 6/14 |
| 9,817,186 | B2 * | 11/2017 | Kamei | G02B 6/126 |
| 9,851,505 | B2 * | 12/2017 | Oka | G02F 1/011 |

(Continued)

OTHER PUBLICATIONS

D. Dai et at, "Mode conversion in tapered submicron siicon ridge optical waveguides", Optics Express, Jun. 4, 2012, pp. 13425-13439, vol. 20, No. 12.

*Primary Examiner* — Thomas A Hollweg
*Assistant Examiner* — Mary A El-Shammaa
(74) *Attorney, Agent, or Firm* — Young Basile Hanlon & MacFarlane, P.C.

(57) ABSTRACT

A waveguide coupling structure includes: a first section that supports a mode that has an associated first intensity profile that substantially overlaps with an intensity profile associated with a mode supported by a first waveguide portion at a first end of the waveguide coupling structure; a second section that supports a mode that has an associated second intensity profile that substantially overlaps with an intensity profile associated with a mode supported by a second waveguide portion at a second end of the waveguide coupling structure; and a third section, between the first section and the second section, comprising a core structure on a bottom cladding and a supporting structure on the bottom cladding. The supporting structure: (1) overlaps with at least a portion of an intensity profile associated with a guided mode of the third section, and (2) has a shape that is asymmetric with respect to a propagation axis of the guided mode in a plane parallel to a surface of the bottom cladding.

17 Claims, 2 Drawing Sheets

(56) References Cited

U.S. PATENT DOCUMENTS

| | | |
|---|---|---|
| 2015/0338577 A1 | 11/2015 | Shi et al. |
| 2017/0068048 A1* | 3/2017 | Kamei ................. G02B 6/2861 |
| 2017/0176677 A1* | 6/2017 | Oka .................... G02B 6/2773 |
| 2018/0231713 A1 | 8/2018 | Picard |
| 2018/0267237 A1* | 9/2018 | Oonawa ............. G02B 6/12004 |

* cited by examiner

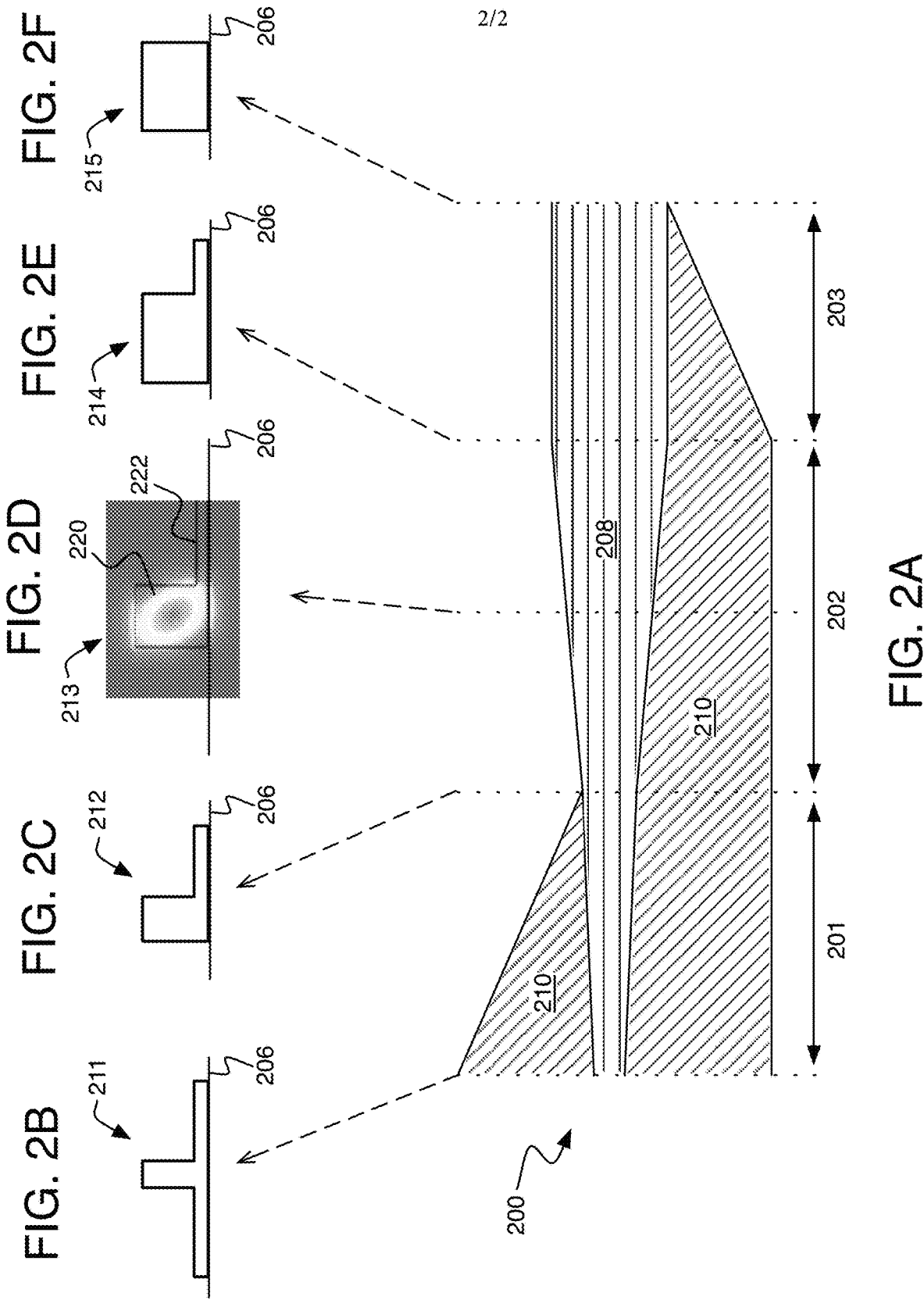

MANAGING MODE TRANSFER IN ASYMMETRIC WAVEGUIDE COUPLING STRUCTURES

TECHNICAL FIELD

This disclosure relates to managing mode transfer in asymmetric waveguide coupling structures.

BACKGROUND

A waveguide is a physical structure that confines and guides the propagation of an electromagnetic wave. Some electromagnetic waves have a spectrum that has a peak wavelength that falls in a particular range of optical wavelengths (e.g., between about 100 nm to about 1 mm, or some subrange thereof), also referred to as optical waves. Photonic integrated circuits (PICs) often include optical waveguides for transporting optical waves around a device and into and out of optical elements (e.g., splitters, modulators, interferometers, resonators, multimode interference (MMI) couplers, etc.). These optical waveguides may be implemented, for example, by forming a core structure from a material having a higher refractive index (e.g., silicon, or silicon nitride) surrounded by a cladding (also called a "buffer") comprising one or more materials (or air) that have a lower refractive index, such as a buried oxide layer (e.g., silicon dioxide) of a substrate, such as a silicon-on-insulator (SOI) wafer. The cladding may in some cases surround the core structure, and may be formed by a single lower-index material, or by multiple different lower-index materials, which may include air if a core material is deposited on top of a cladding material without another material being deposited on top of the core material.

A variety of different types of structures having different geometries can be used to form waveguides in such PICs. For example, a ridge waveguide may refer to a waveguide that has a rectangular (cross-section) core structure on a lower-index cladding. A rib waveguide may refer to a waveguide that has a rectangular core structure having a particular height above the cladding, and lower-height slabs on either side of the rectangular core structure and composed of the same material as the rectangular core structure. These and other waveguide structures can support multiple modes of an optical wave being guided by the waveguide. A mode has an associated spatial distribution of an electromagnetic field intensity in a plane perpendicular to the propagation direction in the waveguide. A mode also has an associated polarization for the electric and magnetic fields of the electromagnetic wave. Some modes can be characterized as transverse electric (TE) modes for which the electric field has a polarization substantially perpendicular to the propagation direction, and some modes can be characterized as transverse magnetic (TM) modes for which the magnetic field has a polarization substantially perpendicular to the direction of propagation. In some cases, modes may be characterized as having hybrid polarization, which is not strictly a TE or TM mode, or has a substantially transverse electric or magnetic field that may not be perfectly perpendicular to the direction of propagation and thus is a substantially TE or substantially TM mode.

SUMMARY

In one aspect, in general, an article of manufacture includes: a bottom cladding having a surface that defines a first plane; a first waveguide portion comprising a first core structure on the bottom cladding, where a first mode supported by the first waveguide portion has a first effective refractive index that is greater than a second effective refractive index of a second mode supported by the first waveguide portion; a second waveguide portion comprising a second core structure on the bottom cladding, where a first mode supported by the second waveguide portion has a third effective refractive index that is greater than a fourth effective refractive index of a second mode supported by the second waveguide portion; and a waveguide coupling structure on the bottom cladding. The waveguide coupling structure includes: a first section that supports a mode that has an associated first intensity profile, where the associated first intensity profile substantially overlaps with an intensity profile associated with the first mode supported by the first waveguide portion at a first end of the waveguide coupling structure; a second section that supports a mode that has an associated second intensity profile, where the associated second intensity profile substantially overlaps with an intensity profile associated with the first mode supported by the second waveguide portion at a second end of the waveguide coupling structure; and a third section, between the first section and the second section, comprising a third core structure on the bottom cladding and a first supporting structure on the bottom cladding, where the first supporting structure: (1) overlaps with at least a portion of an intensity profile associated with a guided mode of the third section, and (2) has a shape that is asymmetric with respect to a propagation axis of the guided mode in a plane parallel to the first plane.

In another aspect, in general, a method for mode conversion includes: coupling an input optical wave into a waveguide coupling structure on a bottom cladding having a surface that defines a first plane from a first waveguide portion comprising a first core structure on the bottom cladding, where a first mode supported by the first waveguide portion has a first effective refractive index that is greater than a second effective refractive index of a second mode supported by the first waveguide portion; coupling an output optical wave out of the waveguide coupling structure into a second waveguide portion comprising a second core structure on the bottom cladding, where a first mode supported by the second waveguide portion has a third effective refractive index that is greater than a fourth effective refractive index of a second mode supported by the second waveguide portion; and converting a mode of the input optical wave to a mode of the output optical wave in the waveguide coupling structure. The waveguide coupling structure includes: a first section that supports a mode that has an associated first intensity profile, where the associated first intensity profile substantially overlaps with an intensity profile associated with the first mode supported by the first waveguide portion at a first end of the waveguide coupling structure; a second section that supports a mode that has an associated second intensity profile, where the associated second intensity profile substantially overlaps with an intensity profile associated with the first mode supported by the second waveguide portion at a second end of the waveguide coupling structure; and a third section, between the first section and the second section, comprising a third core structure on the bottom cladding and a first supporting structure on the bottom cladding, where the first supporting structure: (1) overlaps with at least a portion of an intensity profile associated with a guided mode of the third section, and (2) has a shape that is asymmetric with respect to a propagation axis of the guided mode in a plane parallel to the first plane.

Aspects can include one or more of the following features.

The third section supports at least two guided modes that have effective refractive indices that change as a cross-sectional shape of the third core structure changes, and the effective refractive indices are substantially equal in at least one portion of the third section.

The cross-sectional shape of the third core structure changes adiabatically over at least a portion of a length of the third section.

The first section includes a second supporting structure that is tapered over at least a portion of a length of the first section, and the second section includes a third supporting structure that is tapered over at least a portion of a length of the second section.

The second supporting structure of the first section comprises layers of material on both sides of a waveguide structure in the first section, and the third supporting structure of the second section comprises a layer of material on only one side of a waveguide structure in the second section.

The first supporting structure comprises a layer of material adjacent to only one side of the third core structure, and is adjacent to the second supporting structure and adjacent to the third supporting structure.

The first mode supported by the first waveguide portion is a fundamental mode of the first waveguide portion, and the first mode supported by the second waveguide portion is a fundamental mode of the second waveguide portion.

The first mode supported by the first waveguide portion is a substantially transverse magnetic mode of the first waveguide portion, and the first mode supported by the second waveguide portion is a substantially transverse electric mode of the second waveguide portion.

The second mode supported by the first waveguide portion is a substantially transverse electric mode of the first waveguide portion, and the second mode supported by the second waveguide portion is a substantially transverse magnetic mode of the waveguide portion.

The third core structure has a cross-sectional shape that changes adiabatically over at least a portion of a length of the third section.

The third core structure has a first sidewall on a first side of the propagation axis and a second sidewall on a second side of the propagation axis, and an angle of the first sidewall with respect to first plane is different from an angle of the second sidewall with respect to the first plane.

In another aspect, in general, a polarization rotator includes: a first section that comprises a rib waveguide having a first slab region on a first side of a rib region that is tapered from a nonzero width at a first end of the first section to a zero width at a second end of the first section and a second slab region on a second side of the rib region that has a nonzero width between the first end of the first section and the second end of the first section; a second section that comprises a ridge waveguide having an adjacent supporting structure on a first side of a ridge that is tapered to from a nonzero width at a first end of the second section to a zero width at a second end of the second section; and a third section, between the first section and the second section, comprising a ridge waveguide and an adjacent supporting structure only on one side of a ridge that is adjacent to the supporting structure of the second section and adjacent to the second slab region of the first section. The third section may support at least two guided modes that have effective refractive indices that change as a cross-sectional shape of the ridge waveguide of the third section changes, and the effective refractive indices are substantially equal in at least one portion of the third section. The ridge waveguide of the third section may have a cross-sectional shape that changes adiabatically over at least a portion of a length of the third section.

Aspects can have one or more of the following advantages.

For each type of mode (e.g., TE and TM modes), a given waveguide structure may support multiple mode orders having different properties. For example, one property is the cutoff frequency, which is the lowest frequency for which the mode will be guided in the waveguide, and another property is the effective refractive index $n_{eff}$, which is the ratio between the propagation constant $\beta$ of the mode and vacuum wavenumber, where $$\beta = n_{eff} \frac{2\pi}{\lambda}.$$

A fundamental (or zero-order) mode may have the lowest cutoff frequency (e.g., a cutoff frequency of zero), and the highest effective refractive index, compared to other higher-order modes of the same type, which may have increasing cutoff frequencies and decreasing effective refractive indices as their mode order increases. The mode's intensity profile, polarization, effective refractive index, and other properties of supported modes may be affected by the shape of a main core structure of a waveguide in which most of the field intensity is contained, and of any supporting core structures surrounding the main core structure into which a portion of the field intensity a guided mode may extend. In some cases, a given portion of a waveguide may support two different modes (e.g., a TE mode and a TM mode) that have the same effective refractive index for an optical wave of a given wavelength (called an "effective refractive index coincidence").

When there is an effective refractive index coincidence between two modes supported by a waveguide, any asymmetry in the cross-sectional index distribution with respect to a propagation axis of a core structure of that waveguide can potentially lead to mode hybridization. Mode hybridization is a phenomenon in which there may be a partial energy exchange between the two supported modes that have an effective refractive index coincidence and a cross-sectional asymmetry in proximity to each other. For example, one form of asymmetry that may occur for a waveguide in an integrated platform is a difference between an index of a cladding material below a core structure and an index of a material on top of the core structure (e.g., air or a different cladding material from the cladding material that is formed within the substrate below). There may be a certain range of geometries of the core structure for which such an asymmetry leads to potential mode hybridization. Another form of asymmetry that may occur for a waveguide in an integrated platform is due to fabrication imperfections, such as sidewall asymmetry, as described in more detail below.

In some implementations, the potential vulnerability of a waveguide to the uncontrolled and/or incomplete mode transfer that may occur in a mode hybridization regime, and vulnerability to the associated losses, is prevented or mitigated by introducing certain forms of waveguide asymmetry into the structure of the waveguide (e.g., in main core structures and/or supporting core structures). The potential losses can be reduced by achieving a more controlled and/or more complete mode transfer using the forms of asymmetry described herein. One example of a use of such mode hybridization loss mitigation is in the context of a waveguide coupling structure used for coupling different devices in a PIC. For example, there may be a portion of PIC in which there is a relatively narrow waveguide (e.g., from a directional coupler) that guides an optical wave to another wider waveguide (e.g., at an input of a passive optical component, such as an MMI coupler). An adiabatic transition from the narrower waveguide to the wider waveguide may include a portion that would potentially be vulnerable to mode hybridization losses due to some of a fundamental guided mode being transferred to another mode, such as a mode having a different polarization (e.g., energy in a TM mode transferred to a TE mode). But, instead of attempting to avoid such losses by avoiding the asymmetry that causes mode hybridization, the unintended potential loss can be turned into an intended mode conversion by incorporating polarization rotation into the waveguide coupling structure in a mode converter that deliberately exploits mode hybridization, as described in more detail below.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 2A-2F are top and cross-sectional views of a hybridized mode converter.

DETAILED DESCRIPTION

Figure 1:
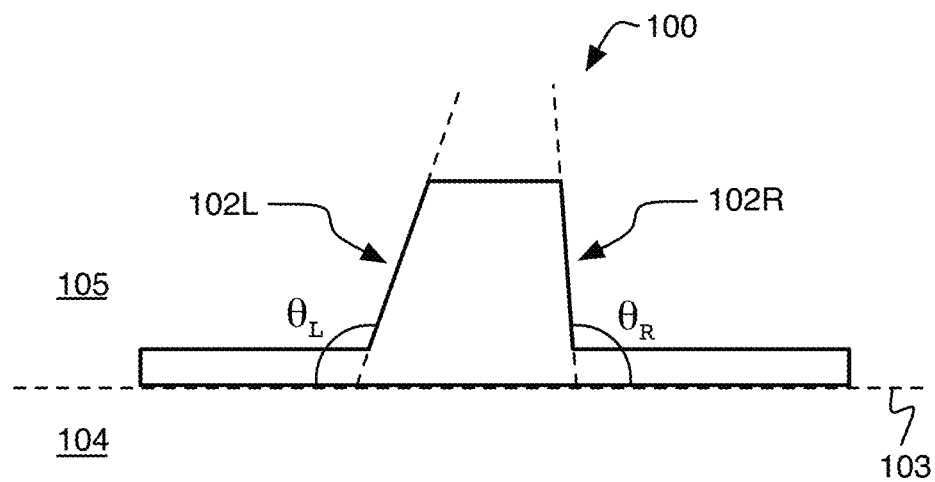
FIG. 1 is a cross-sectional view of a portion of a waveguide surrounded by a cladding.

One form of asymmetry that may occur for a waveguide in an integrated platform is sidewall angle asymmetry, which may occur due to fabrication imperfections. For example, when etching a waveguide from a given material (e.g., Silicon), the angle of the two sidewalls of a rib waveguide may differ from each other. Referring to FIG. 1, in a cross-sectional view of a rib waveguide 100, the angle $\theta_L$ of the left sidewall 102L with respect to a plane 103 of a surface of a bottom cladding 104 composed of a bottom cladding material (e.g., a buried oxide layer of an SOI wafer) may be larger than the angle $\theta_R$ of the right sidewall 102R with respect to the plane 104. For example, $\theta_R$ may be 92 degrees and $\theta_L$ may be 96 degrees. A top cladding 105 is composed of a top cladding material, which could be the same material as is used for the bottom cladding 104, or a different material. This sidewall asymmetry may occur due to random imperfections or may occur due to systematic limitations of the fabrication equipment. For example, the difference between the two sidewall angles may be more pronounced at certain regions of a wafer (e.g., becoming larger as the distance from the center of the wafer increases) if the fabrication equipment is optimized for operation near the center of the wafer.

If sidewall angle asymmetry, or another form of waveguide asymmetry, occurs in a portion of a waveguide that supports two modes having an effective refractive index coincidence, there may be uncontrolled and/or partial energy transfer between those two modes. The optical devices that are coupled to such a waveguide may be designed to receive an optical wave in a particular designed mode (e.g., a fundamental mode), but any uncontrolled and/or partial energy transfer into a different mode may represent a significant undesired loss. Additionally, even if there is a transfer of energy back into the designed mode, the fields of the optical waves being combined may interfere, which would add a parasitic interference pattern to an original signal that has been modulated onto an optical wave.

A hybridized mode converter device, as described herein, is able to serve as both a mode size converter and a polarization rotator. Such a device can be used, for example, in a PIC to connect a transport waveguide used for transporting optical signals in the PIC to an input or output port of an optical device (e.g., an MMI), where the transport waveguide and the port have different widths. For example, a hybridized mode converter may provide a junction between a transport waveguide that has a height $h_T$ larger than its width $w_T$ ($h_T > w_T$) and an input port of an MMI device that has a width $w_p$ larger than its height $h_p$ ($w_p > h_p$). A different kind of coupling device that simply provided an adiabatic taper between the waveguide and the port could, at some portion of the taper, have an effective refractive index coincidence between two different modes, potentially leading to an undesired energy transfer between the two modes with the presence of certain fabrication imperfections. Instead, a hybridized mode converter is able to provide mode size conversion by introducing a designed asymmetry that takes advantage of the effective refractive index coincidence to force a more controlled and complete mode conversion between two modes that have different sizes and different polarizations (e.g., a polarization rotation of 90 degrees by virtue of conversion from a TM mode to a TE mode).

FIGS. 2A-2F show an example of a hybridized mode converter device 200 configured so that the designed asymmetry has a stronger effect than an effect from a potential fabrication asymmetry (e.g., based on an assumed range of potential differences in sidewall angles). In this example, the designed asymmetry enables an optical wave being guided in a TM fundamental mode of a narrow transport waveguide ($h_T > w_T$) to be fully transferred (from left to right) to a TE fundamental mode of a wide input port ($w_p > h_p$). The device 200 is able to function in both directions so that an optical wave being guided in the TE fundamental mode can also be fully transferred (from right to left) into the TM fundamental mode. Alternatively, in other examples of a hybridized mode converter, the modes that are coupled are not necessarily fundamental modes (e.g., coupling could occur between a fundamental and a higher order mode, or between two higher order modes).

The top view (FIG. 2A) and associated cross-sectional views (FIGS. 2B-2F) illustrate attributes of different sections of the waveguide coupling structure that forms the device 200: a left section 201, a middle section 202, and a right section 203. Generally, in this device 200, the designed asymmetry is induced by the disappearance of a slab region on only one side of a tapered rib core structure in the middle section 202. This designed asymmetry enables a mode hybridization of the guided modes supported by the tapered rib core structure, and allows the TM fundamental mode to be evolved into the TE fundamental mode as the width of the core structure (and therefore its cross-sectional shape) changes adiabatically over the middle section 202. The three different sections will now be described in the context of an example case in which an input optical wave enters into the left section 201 and exits from the right section 203. However, the device 200 also operates in a case in which an input optical wave enters into the right section 203 and exits from the left section 201, or equivalently an alternative device implementation could correspond to the mirror image (left-to-right) of the example shown in FIG. 2A.

The device 200 is formed from different main core structures and supporting core structures that have been fabricated on top of a cladding. The cladding may be made from a single cladding material, which has a top surface 206 that defines a plane that will be used as a frame of reference (parallel to the plane of the page in FIG. 2A and perpendicular to the plane of the page in FIGS. 2B-2F). The left section 201 has a cross-sectional shape 211 at the left end (shown in FIG. 2B) that matches shape of a narrower transport waveguide (not shown), which is a rib waveguide that supports a fundamental TM input mode TM0 that has an effective refractive index $n_{TM0}$ that is greater than a refractive index $n_{clad}$ of the cladding material. The effective refractive index $n_{TM0}$ is also greater than the effective refractive index of TE modes and of higher order TM modes supported by the transport waveguide. The right section 203 has a cross-sectional shape 215 at the right end (shown in FIG. 2F) that matches the shape of a wider device port waveguide (not shown), which is a ridge waveguide that supports a fundamental TE mode TE0 that has an effective refractive index $n_{TE0}$ that is greater than the refractive index $n_{clad}$ of the cladding material. The effective refractive index $n_{TE0}$ is also greater than the effective refractive index of TM modes and of higher order TE modes supported by the device port waveguide.

The shape of the main core structures and supporting core structures of the device 200 change gradually over the different sections. The left section 201 supports a mode, at the left end, that has an intensity profile that substantially overlaps with an intensity profile of the TM0 mode supported by the transport waveguide. The right section 203 supports a mode, at the right end, that has an intensity profile that substantially overlaps with an intensity profile of the TE0 mode supported by device port waveguide. From the left end of the left section 201, moving toward the middle section 202, a main core structure 208 along a propagation axis starts in the form of a rib waveguide that has a (top) portion of a supporting core slab structure 210, on one side of the main core structure 208, which is tapered from a nonzero width at one end to a zero width the other end. On the other side of the main core structure 208, is a (bottom) portion of the supporting core slab structure 210 that has a nonzero width between the ends of the left section 201. From the right end of the right section 203, moving toward the middle section 202, the main core structure 208 starts in the form of a ridge waveguide and has an adjacent supporting core slab structure 210 on one side of the ridge that is tapered to from a zero width to a nonzero width where it meets the supporting core slab structure 210 of the middle section 202.

In the middle section 202, the main core structure 208 is in the form of a tapered waveguide structure that has a cross-sectional shape that changes adiabatically over the length of the middle section 202. FIG. 2C shows a cross-sectional shape 212 of the waveguide coupling structure as it is at the intersection between the left section 201 and the middle section 202; and FIG. 2E shows a cross-sectional shape 214 of the waveguide coupling structure as it is at the intersection between the middle section 202 and the right section 203. As the field distribution of the supported mode changes, the effective refractive indices of the supported modes also change. Since the supporting core slab structure 210 is only on one side of the main core structure 208 in the middle region 202, the composite tapered waveguide structure (also called a tapered ridge structure) has a shape that is asymmetric with respect to a propagation axis of the guided mode along the main core structure 208 (and in the plane of the cladding surface 206). This designed asymmetry is strong enough to force a substantially complete mode transfer since it is in proximity to a position where a cross-sectional shape 213 (shown in FIG. 2D) provides an effective refractive index coincidence. The resulting mode hybridization enables a slowly evolved mode conversion between the TM0 mode and the TE0 mode of the waveguide structures being coupled. A hybrid mode profile 220 shows the intensity profile of an optical wave that is in the process of mode conversion. The mode conversion also brings the associated polarization rotation that comes from the slow evolution between the TM and TE modes. Even though the mode profile 220 is mostly contained within a main core structure of the waveguide coupling structure, a portion of the supporting core slab structure 222 overlaps with a portion of the mode profile 220 on one side (e.g., in some implementations, an evanescent wave portion), which has an asymmetric effect on guided wave propagation and yields mode hybridization that is insensitive to fabrication imperfections, such as the sidewall asymmetry described above.

Figure 3:
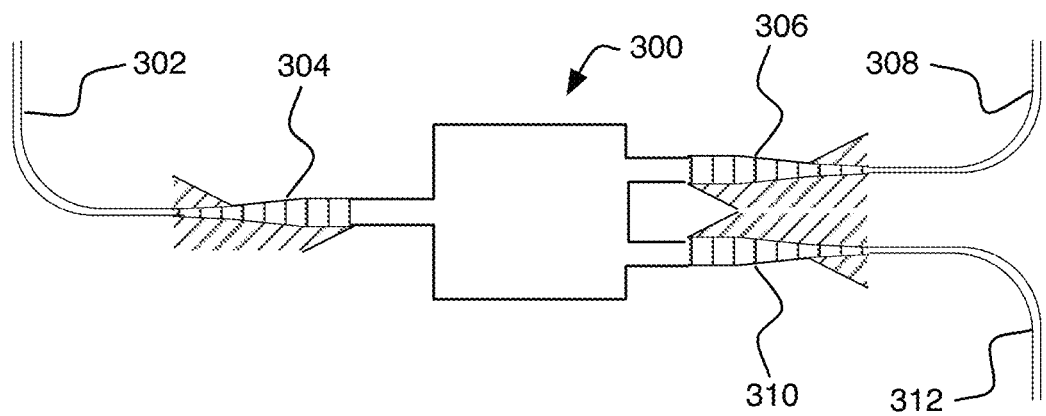
FIG. 3 is a top view of a portion of a PIC that incorporates hybridized mode converters.

FIG. 3 shows an example of a portion of a PIC that incorporates hybridized mode converters. In this example, an MMI device 300 acts as a 1×2 coupler that may be used in any of a variety of PIC platforms that use waveguides to provide connectivity between modules with different functionalities. The modules can be designed to make use of both the mode conversion and the polarization rotation that is provided by the hybridized mode converter devices. The resulting mode shape and polarization control is able to limit the losses on such a PIC platform. In this example, an input waveguide 302 is coupled using a hybridized mode converter 304 to an input port of the MMI device 300. A first output port of the MMI device 300 is coupled using a hybridized mode converter 306 to a first output waveguide 308. Second output port of the MMI device 300 is coupled using a hybridized mode converter 310 to a second output waveguide 312. The hybridized mode converters can be used in any of a variety of other PIC applications to yield modular designs that have improved insensitivity to fabrication imperfections.

A variety of alternative configurations of hybridized mode converter can be implemented. For example, in some implementations, the shape of the main core structures and supporting core structures of the device may still change over the different sections, but not necessarily adiabatically.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An article of manufacture, comprising:
   a bottom cladding having a surface that defines a first plane;
   a first waveguide portion comprising a first core structure on the bottom cladding, where a first mode supported by the first waveguide portion has a first effective refractive index that is greater than a second effective refractive index of a second mode supported by the first waveguide portion;

a second waveguide portion comprising a second core structure on the bottom cladding, where a first mode supported by the second waveguide portion has a third effective refractive index that is greater than a fourth effective refractive index of a second mode supported by the second waveguide portion; and a waveguide coupling structure on the bottom cladding, the waveguide coupling structure comprising:

a first section that supports a mode that has an associated first intensity profile, where the associated first intensity profile substantially overlaps with an intensity profile associated with the first mode supported by the first waveguide portion at a first end of the waveguide coupling structure;

a second section that supports a mode that has an associated second intensity profile, where the associated second intensity profile substantially overlaps with an intensity profile associated with the first mode supported by the second waveguide portion at a second end of the waveguide coupling structure; and a third section, between the first section and the second section, comprising a third core structure on the bottom cladding and a first supporting structure on the bottom cladding, where the first supporting structure: (1) overlaps with at least a portion of an intensity profile associated with a guided mode of the third section, and (2) has a shape that is asymmetric with respect to a propagation axis of the guided mode in a plane parallel to the first plane.

2. The article of manufacture of claim 1, where the third section supports at least two guided modes that have effective refractive indices that change as a cross-sectional shape of the third core structure changes, and the effective refractive indices are substantially equal in at least one portion of the third section.

3. The article of manufacture of claim 2, where the cross-sectional shape of the third core structure changes adiabatically over at least a portion of a length of the third section.

4. The article of manufacture of claim 1, where the first section includes a second supporting structure that is tapered over at least a portion of a length of the first section, and the second section includes a third supporting structure that is tapered over at least a portion of a length of the second section.

5. The article of manufacture of claim 4, where the second supporting structure of the first section comprises layers of material on both sides of a waveguide structure in the first section, and the third supporting structure of the second section comprises a layer of material on only one side of a waveguide structure in the second section.

6. The article of manufacture of claim 5, where the first supporting structure comprises a layer of material adjacent to only one side of the third core structure, and is adjacent to the second supporting structure and adjacent to the third supporting structure.

7. The article of manufacture of claim 1, where the first mode supported by the first waveguide portion is a fundamental mode of the first waveguide portion, and the first mode supported by the second waveguide portion is a fundamental mode of the second waveguide portion.

8. The article of manufacture of claim 7, where the first mode supported by the first waveguide portion is a substantially transverse magnetic mode of the first waveguide portion, and the first mode supported by the second waveguide portion is a substantially transverse electric mode of the second waveguide portion.

9. The article of manufacture of claim 8, where the second mode supported by the first waveguide portion is a substantially transverse electric mode of the first waveguide portion, and the second mode supported by the second waveguide portion is a substantially transverse magnetic mode of the waveguide portion.

10. The article of manufacture of claim 1, where the third core structure has a cross-sectional shape that changes adiabatically over at least a portion of a length of the third section.

11. The article of manufacture of claim 1, where the third core structure has a first sidewall on a first side of the propagation axis and a second sidewall on a second side of the propagation axis, and an angle of the first sidewall with respect to first plane is different from an angle of the second sidewall with respect to the first plane.

12. A method for mode conversion, comprising:

coupling an input optical wave into a waveguide coupling structure on a bottom cladding having a surface that defines a first plane from a first waveguide portion comprising a first core structure on the bottom cladding, where a first mode supported by the first waveguide portion has a first effective refractive index that is greater than a second effective refractive index of a second mode supported by the first waveguide portion;

coupling an output optical wave out of the waveguide coupling structure into a second waveguide portion comprising a second core structure on the bottom cladding, where a first mode supported by the second waveguide portion has a third effective refractive index that is greater than a fourth effective refractive index of a second mode supported by the second waveguide portion; and converting a mode of the input optical wave to a mode of the output optical wave in the waveguide coupling structure, the waveguide coupling structure comprising:

a first section that supports a mode that has an associated first intensity profile, where the associated first intensity profile substantially overlaps with an intensity profile associated with the first mode supported by the first waveguide portion at a first end of the waveguide coupling structure;

a second section that supports a mode that has an associated second intensity profile, where the associated second intensity profile substantially overlaps with an intensity profile associated with the first mode supported by the second waveguide portion at a second end of the waveguide coupling structure; and a third section, between the first section and the second section, comprising a third core structure on the bottom cladding and a first supporting structure on the bottom cladding, where the first supporting structure: (1) overlaps with at least a portion of an intensity profile associated with a guided mode of the third section, and (2) has a shape that is asymmetric with respect to a propagation axis of the guided mode in a plane parallel to the first plane.

13. The method of claim 12, where the third section supports at least two guided modes that have effective refractive indices that change as a cross-sectional shape of the third core structure changes, and the effective refractive indices are substantially equal in at least one portion of the third section.

14. The method of claim 13, where the cross-sectional shape of the third core structure changes adiabatically over at least a portion of a length of the third section.

15. The method of claim 12, where the first section includes a second supporting structure that is tapered over at least a portion of a length of the first section, and the second section includes a third supporting structure that is tapered over at least a portion of a length of the second section.

16. The method of claim 15, where the second supporting structure of the first section comprises layers of material on both sides of a waveguide structure in the first section, and the third supporting structure of the second section comprises a layer of material on only one side of a waveguide structure in the second section.

17. The method of claim 16, where the first supporting structure comprises a layer of material adjacent to only one side of the third core structure, and is adjacent to the second supporting structure and adjacent to the third supporting structure.

* * * * *